April 28, 1931. A. A. GORDON 1,803,181
AUTOMATIC PICK AND PICK LOOM
Filed July 10, 1928 12 Sheets-Sheet 3

INVENTOR
ALBERT A. GORDON

ATTORNEYS

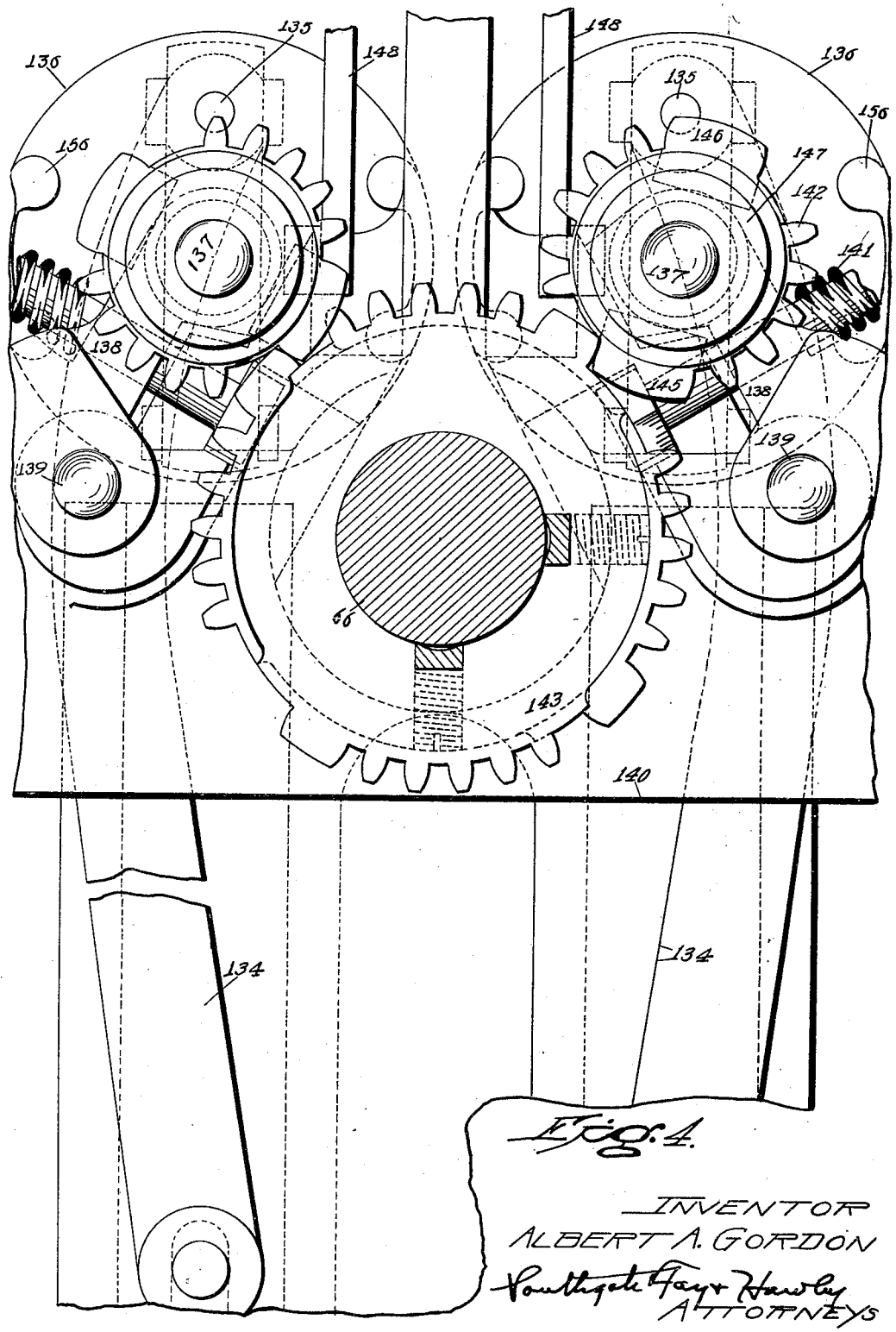

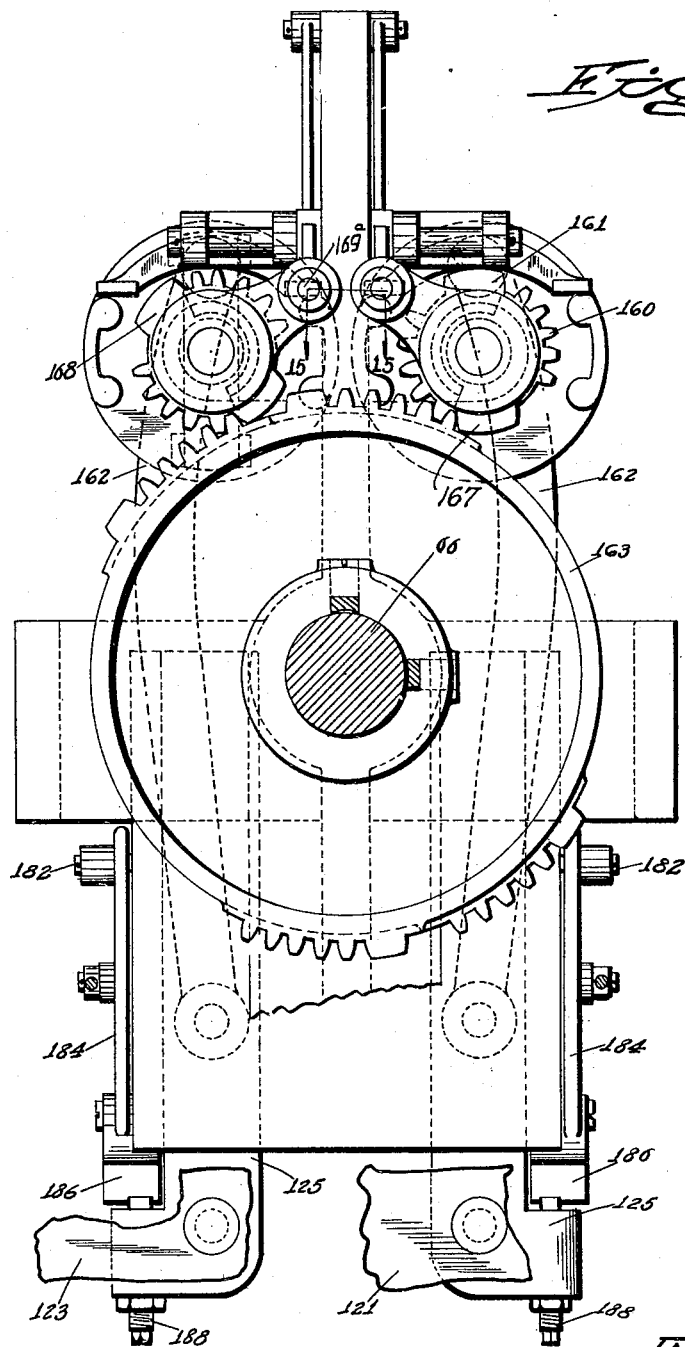

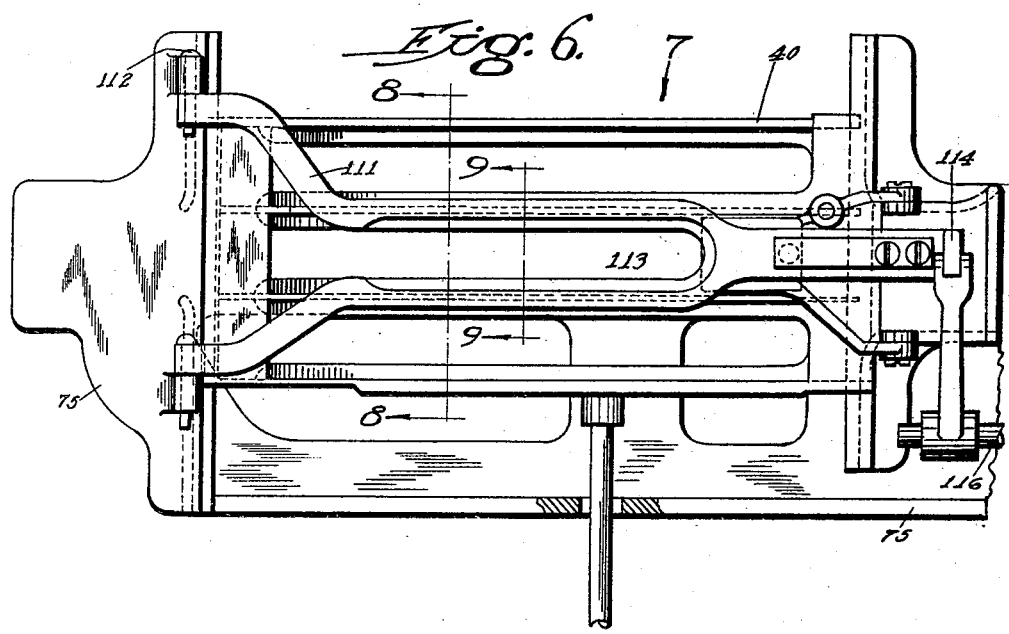
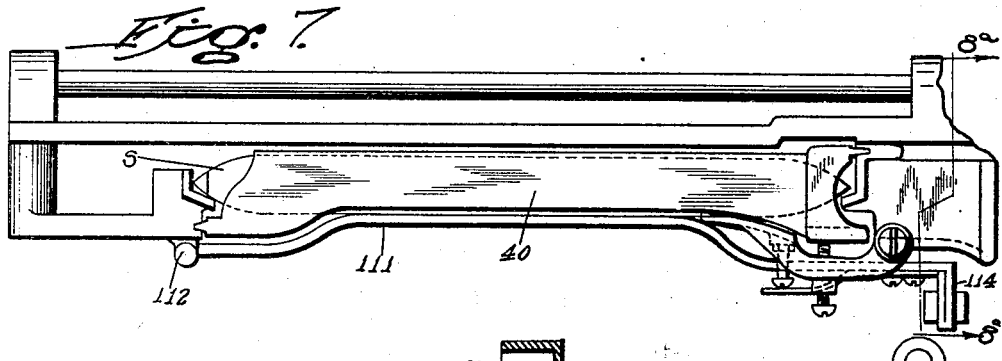
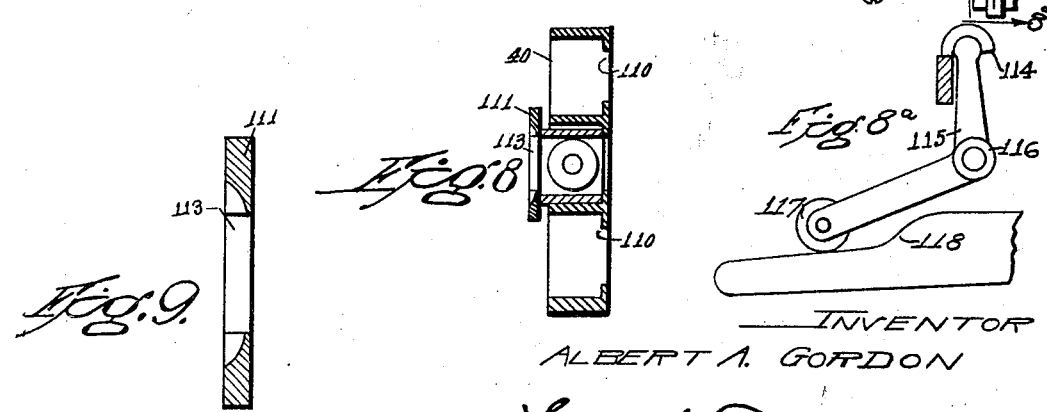

April 28, 1931.  A. A. GORDON  1,803,181
AUTOMATIC PICK AND PICK LOOM
Filed July 10, 1928   12 Sheets-Sheet 7

INVENTOR
ALBERT A. GORDON

Southgate Hayes Hawley
ATTORNEYS.

April 28, 1931.  A. A. GORDON  1,803,181
AUTOMATIC PICK AND PICK LOOM
Filed July 10, 1928   12 Sheets-Sheet 8
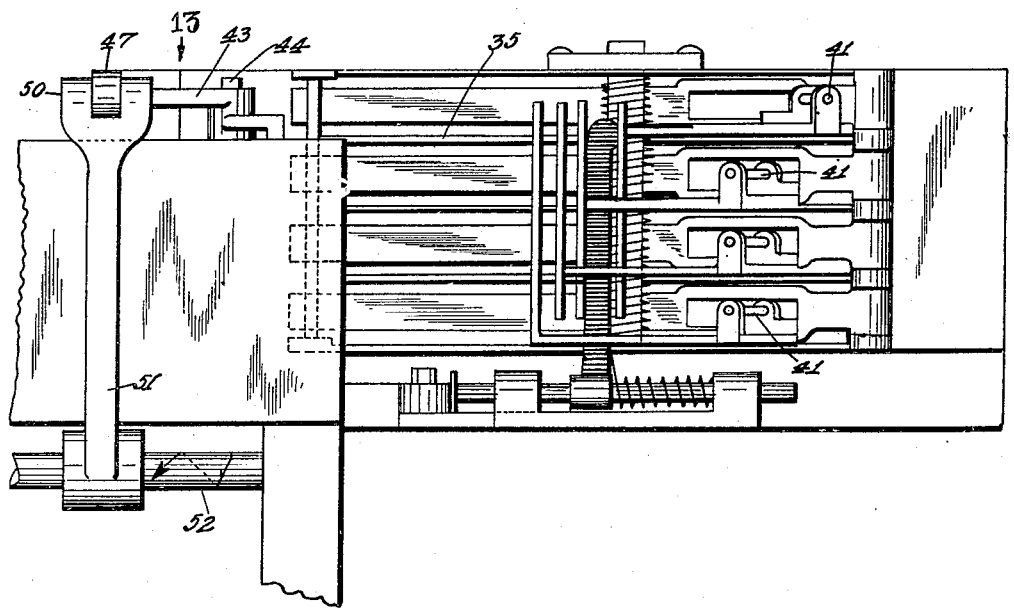
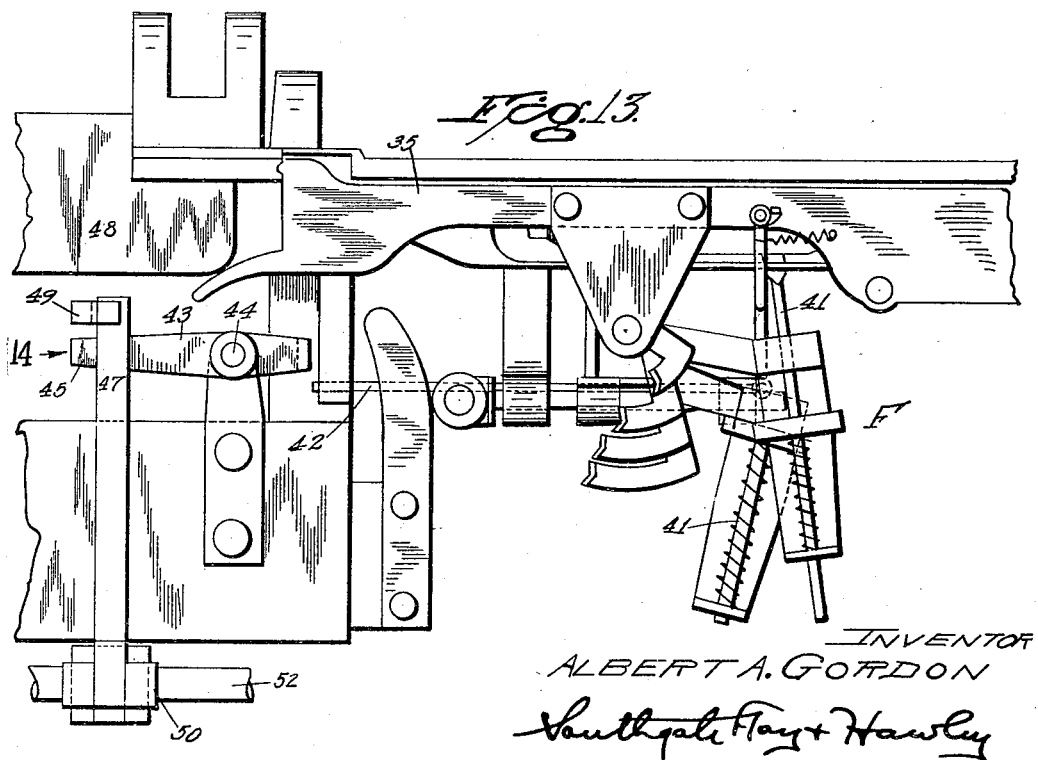

April 28, 1931. A. A. GORDON 1,803,181
AUTOMATIC PICK AND PICK LOOM
Filed July 10, 1928 12 Sheets-Sheet 9

INVENTOR
ALBERT A. GORDON
Southgate Fay + Hawley
ATTORNEYS.

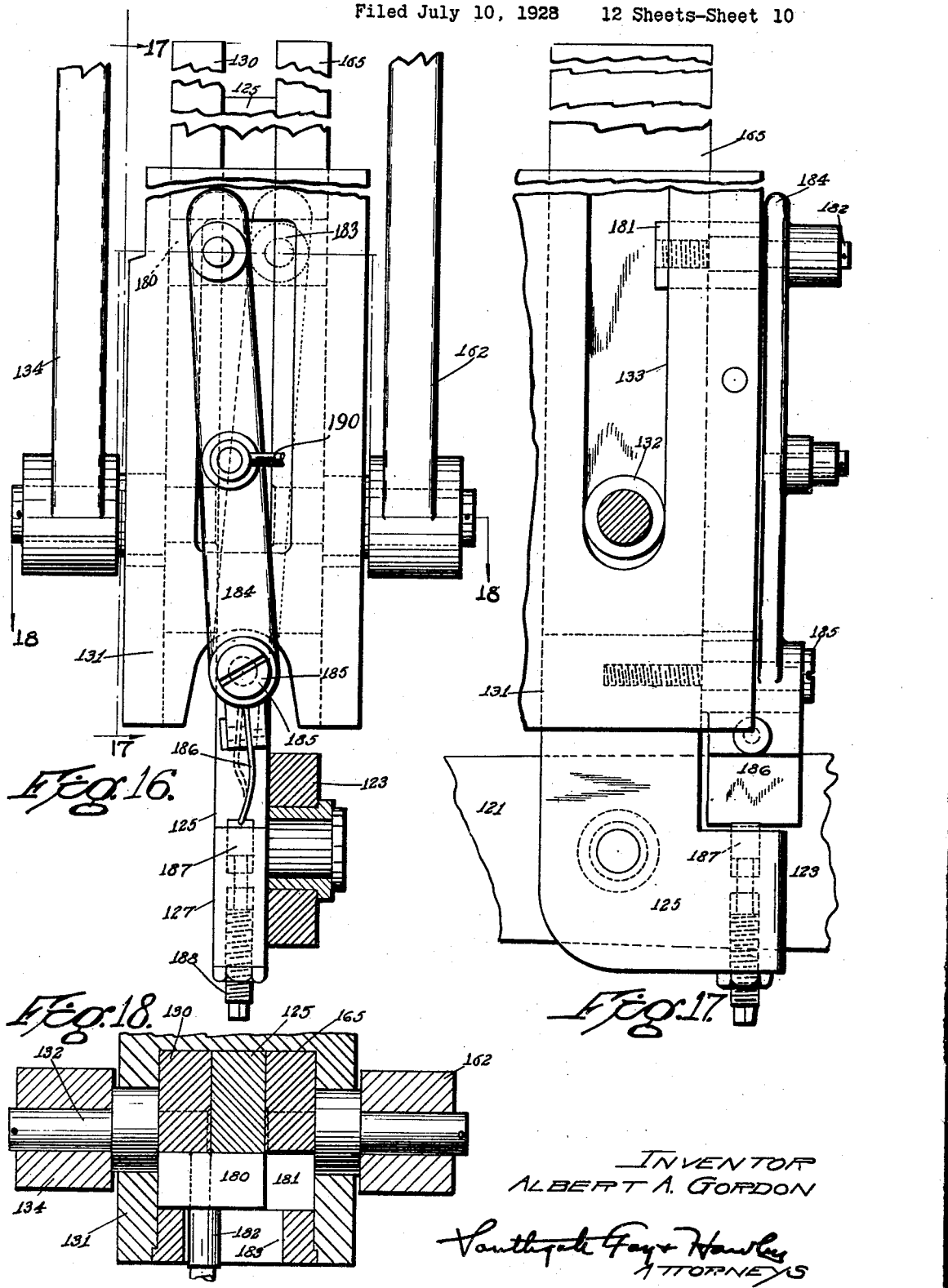

April 28, 1931.  A. A. GORDON  1,803,181
AUTOMATIC PICK AND PICK LOOM
Filed July 10, 1928  12 Sheets-Sheet 11
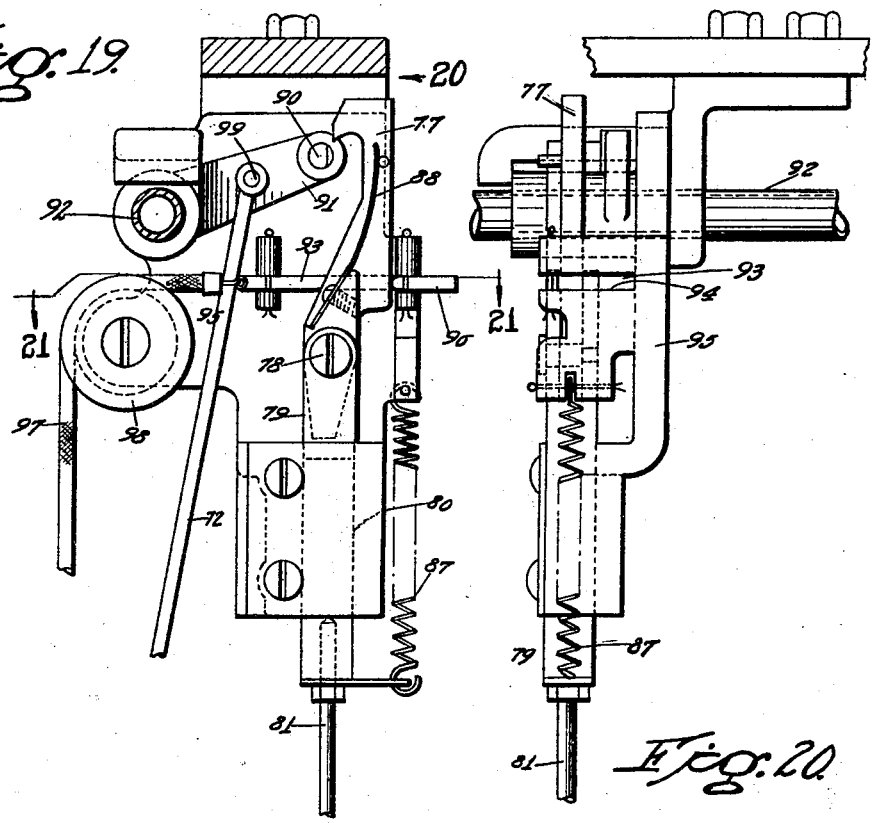
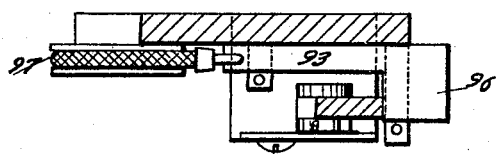
INVENTOR
ALBERT A GORDON
ATTORNEYS

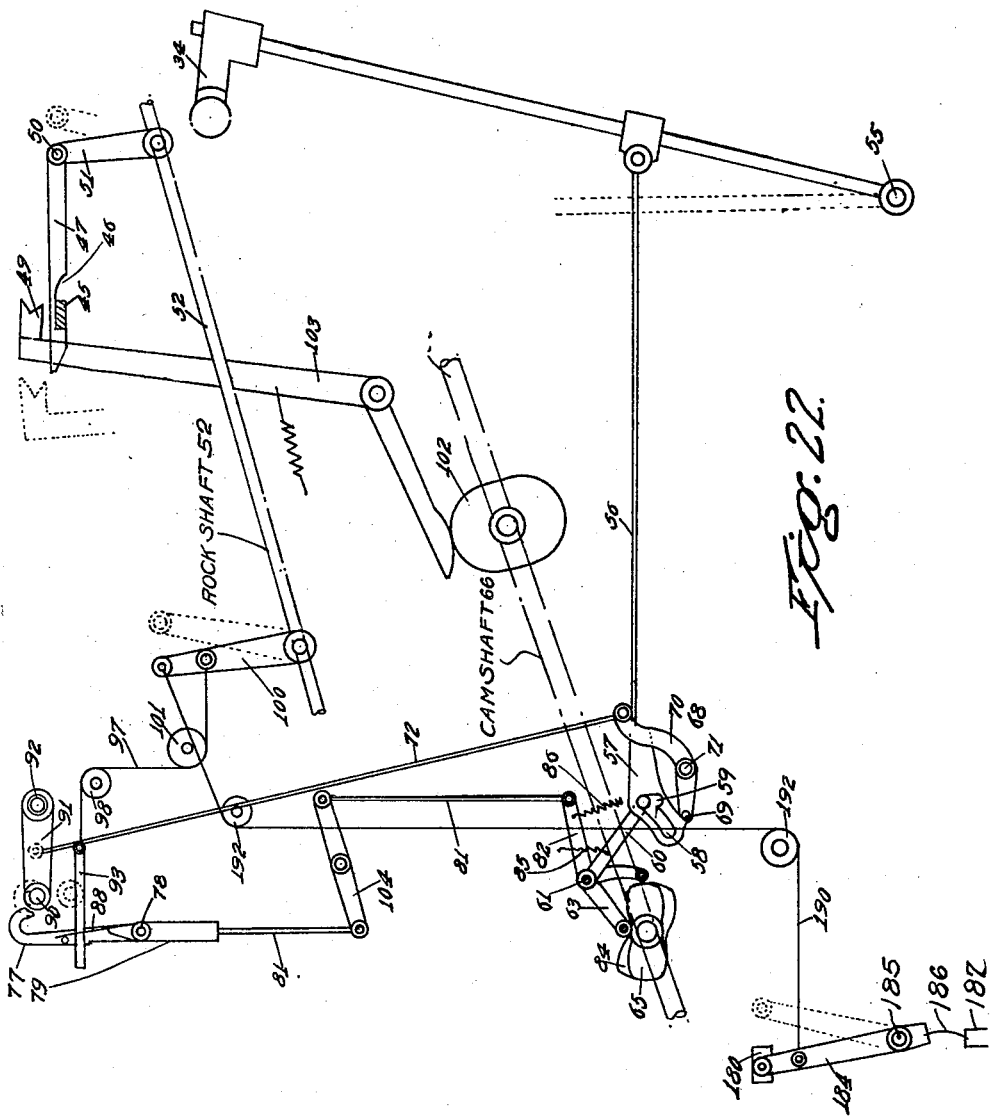

Patented Apr. 28, 1931

1,803,181

UNITED STATES PATENT OFFICE

ALBERT A. GORDON, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

AUTOMATIC PICK-AND-PICK LOOM

Application filed July 10, 1928. Serial No. 291,541.

This invention relates particularly to an automatic weft replenishing pick-and-pick loom, although certain features thereof are capable of more general application.

One object of the invention is to provide a loom of this type in which a detecting mechanism is provided at one end of the loom and a replenishing magazine is provided at the opposite end of the loom, and in which improved mechanism is provided for transferring a bobbin horizontally to a shuttle in any one of the different drop boxes.

Another object is to provide a weft replenishing loom in which each shuttle has an assigned shuttle box at the detecting end of the loom and in which each shuttle may be replenished in any one of the drop boxes at the magazine end of the loom.

A further object is to provide a loom in which the weft detector indicates the shuttle about to be picked and the replenishing mechanism transfers a bobbin to the shuttle in the running shuttle box as soon as the shuttle is received and before a box change can take place.

I have provided mechanism for independently operating and controlling the drop boxes at each side of the loom and I have also provided means for delaying the shifting of the drop boxes at the magazine end of the loom when transfer takes place and for thereafter shifting the boxes at increased speed.

My invention further relates to arrangements and combinations of parts which will be hereinafter set forth and more particularly pointed out in the appended claims.

A preferred form of the invention is shown in the drawings in which

Fig. 4 is an enlarged partial end elevation of the drop box mechanism, looking in the direction of the arrow 4 in Fig. 3;

Fig. 5 is an end elevation of the drop box mechanism, looking in the direction of the arrow 5 in Fig. 3;

Fig 6 is a front elevation of the drop boxes at the magazine end of the loom looking in the direction of the arrow 6 in Fig. 1;

Fig. 7 is a plan view of the parts shown in Fig. 6, looking in the direction of the arrow 7 in said figure;

Fig. 8 is a sectional end elevation of the drop boxes, taken along the line 8—8 in Fig. 6;

Figure 1:
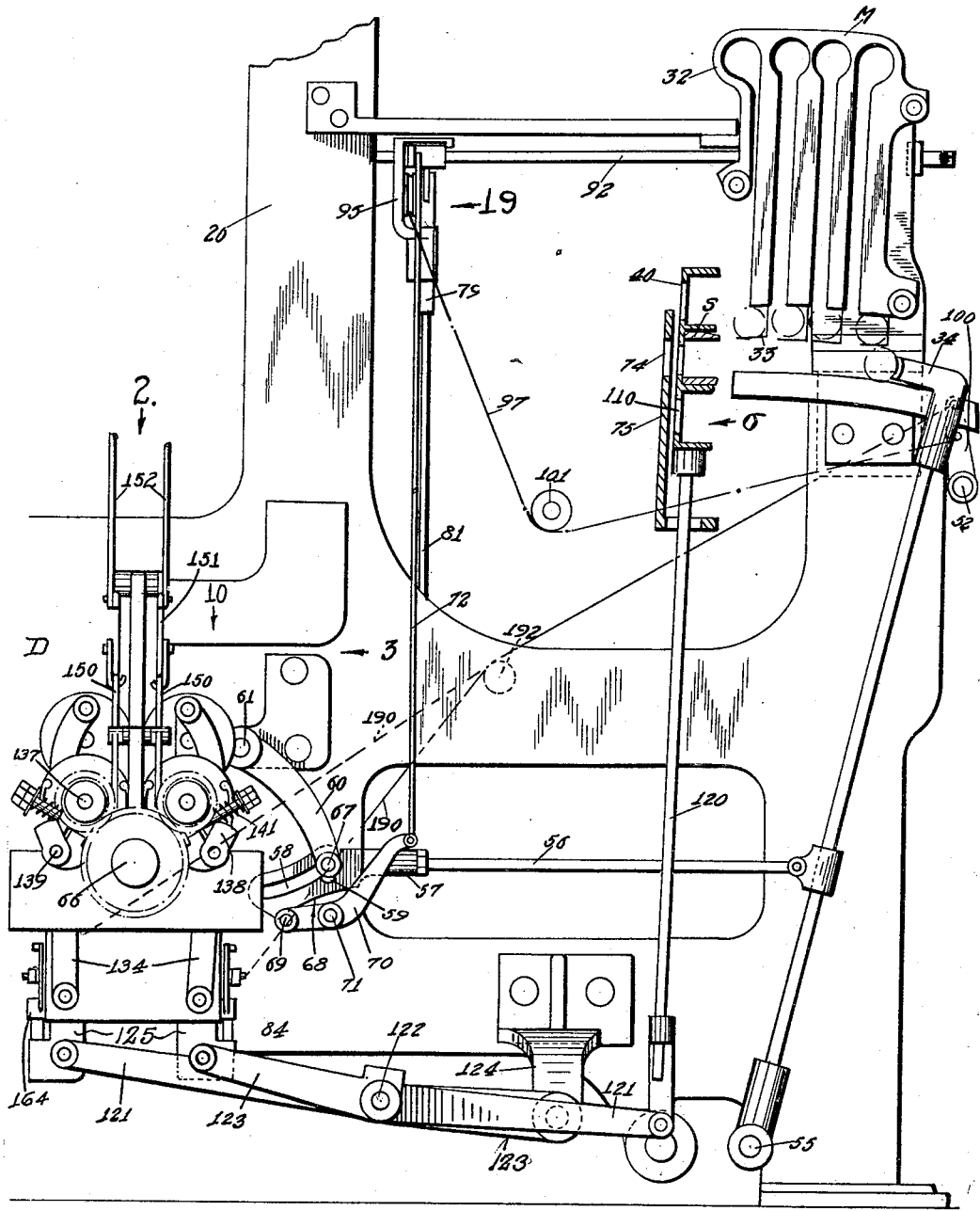
Fig. 1 is a partial end elevation of a loom embodying my improvements, with the lay end and drop boxes shown in section.
Figure 2:
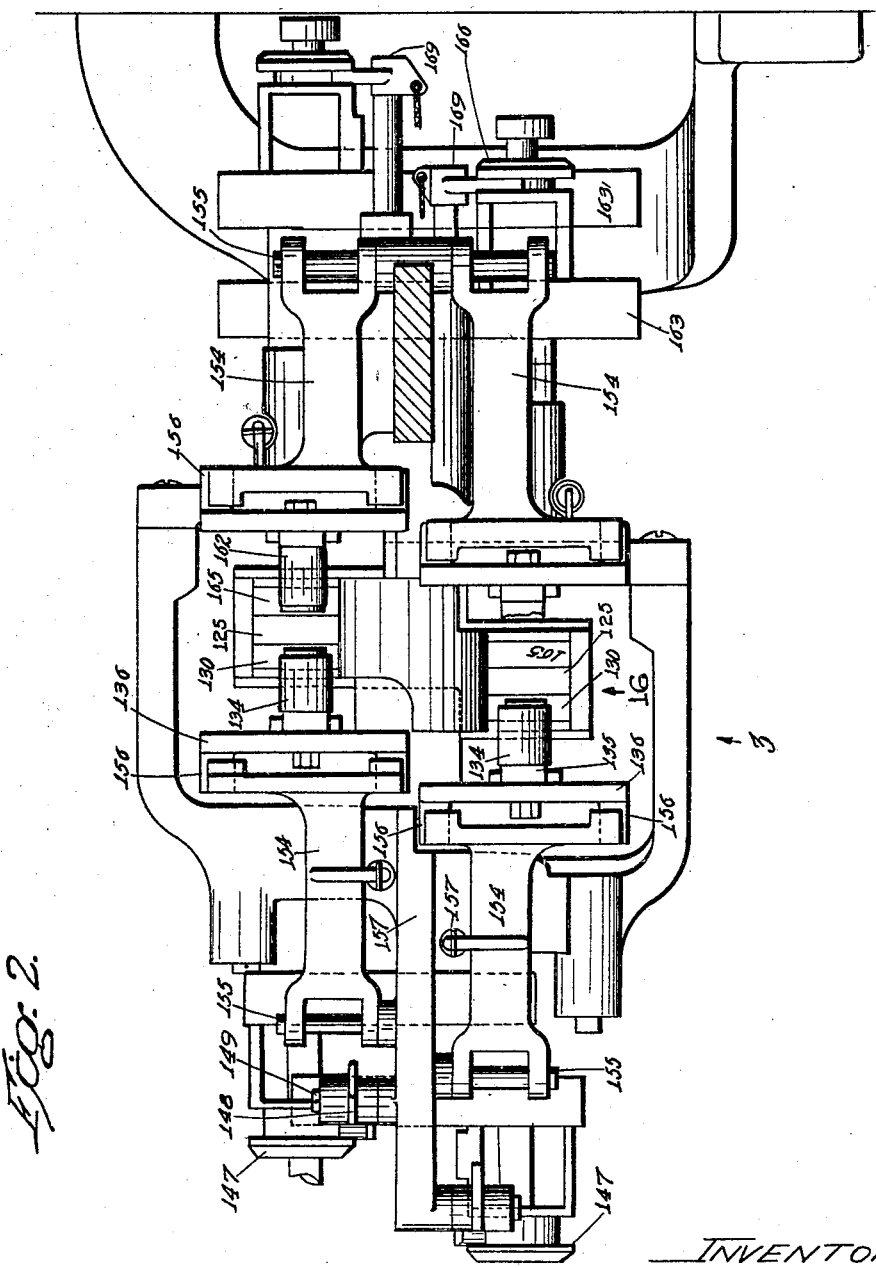
Fig. 2 is a plan view of the drop box actuating mechanism, looking in the direction of the arrow 2 in Fig. 1.
Figure 10:
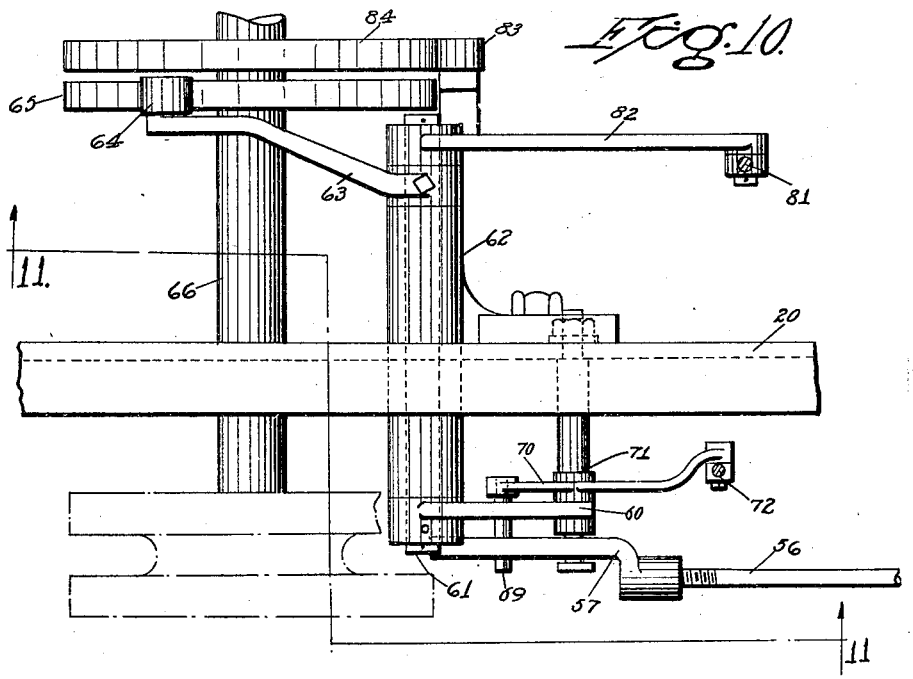
Figure 11:
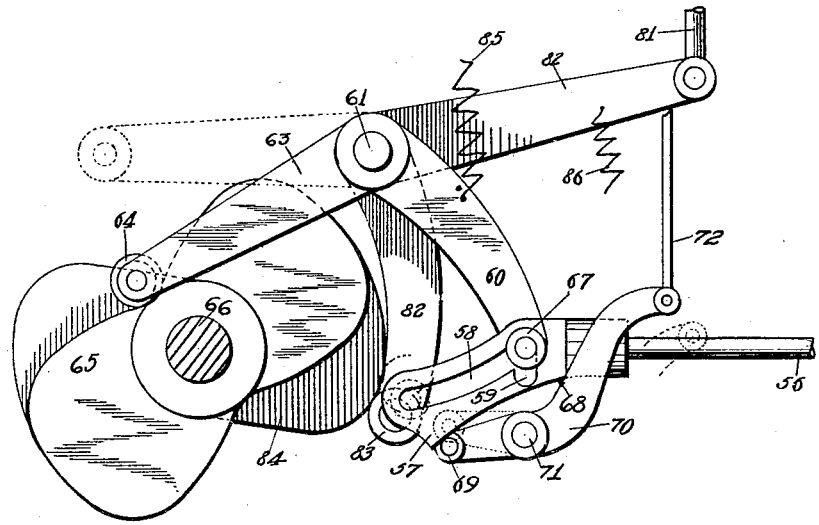
Figure 15:
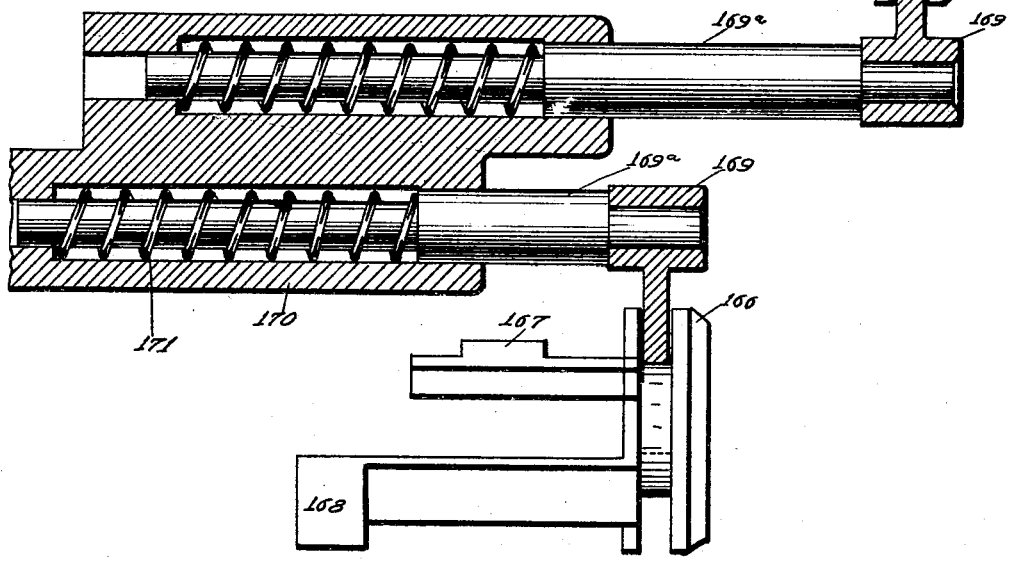
Figure 14:
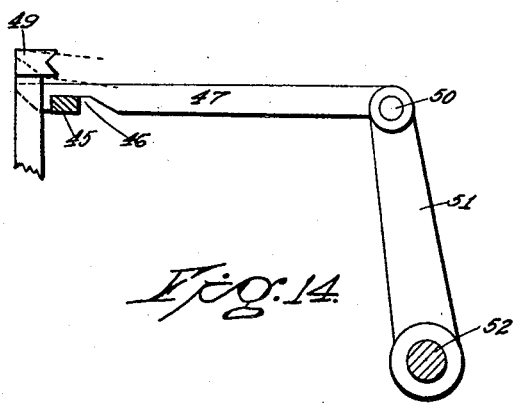

Fig. 8$^a$ is a sectional end elevation showing certain binder relieving mechanism, taken along the line 8$^a$—8$^a$ in Fig. 7;

Fig. 9 is an enlarged transverse sectional elevation of the binder, taken along the line 9—9 in Fig. 6;

Fig. 10 is a plan view of certain actuating mechanism, looking in the direction of the arrow 10 in Fig. 1;

Fig. 11 is a sectional side elevation of the same parts, taken along the line 11—11 in Fig. 10;

Fig. 12 is a front elevation of the drop boxes at the detecting end of the loom and of the detecting mechanism associated therewith;

Fig. 13 is a plan view of the same parts, looking in the direction of the arrow 13 in Fig. 12;

Fig. 14 is a detail sectional view of certain connections, looking in the direction of the arrow 14 in Fig. 13;

Fig. 15 is an enlarged sectional plan view, taken along the line 15—15 in Fig. 5;

Fig. 16 is a front elevation of certain control mechanism, looking in the direction of the arrow 16 in Fig. 2;

Fig. 17 is a sectional side elevation of the same parts, taken along the line 17—17 in Fig. 16;

Fig. 18 is a sectional plan view of said parts, taken along the line 18—18 in Fig. 16;

Fig. 19 is a front elevation of certain transfer control mechanism, looking in the direction of the arrow 19 in Fig. 1;

Fig. 20 is an end elevation thereof, looking in the direction of the arrow 20 in Fig. 19;

Fig. 21 is a sectional plan view, taken along the line 21—21 in Fig. 19; and

Fig. 22 is a diagrammatic view, illustrating the co-operative relation of the several parts of my invention.

General construction

Referring to the drawings, I have shown a loom frame 20 on which I have mounted a magazine or storage mechanism M, a drop box actuating mechanism D, and detecting or feeler mechanism F. The magazine and drop box mechanism D are shown at the left hand end of the loom, while the detecting mechanism is at the right hand end.

Magazine and drop boxes

The magazine M is of the general type shown in my prior application Serial No. 212,996 filed August 15, 1927, and comprises a frame 32 in which bobbin holders 33 are vertically slidable and in which any one of the holders 33 may be selectively depressed to present a desired color of bobbin in the path of a transferrer or carrier 34 (Fig. 1).

I have shown a magazine having compartments for four different kinds or colors of weft carriers and I have shown drop boxes 35 (Fig. 12) at the right hand end of the loom, equal in number to the number of compartments in the magazine.

In the ordinary operation of the loom, each shuttle will have a definitely assigned box at the detecting end of the loom and the selection of a bobbin to be transferred from the magazine is or may be controlled directly from the vertical position of the drop boxes 35 at the detecting end of the loom.

At the magazine end of the loom I have provided three boxes 40, and transfer is made to the running shuttle as soon as received and irrespective of the box in which it is positioned. The reason for reducing the number of boxes at the magazine end will be hereinafter explained.

Detecting mechanism

The particular detecting mechanism used for indicating the condition of the weft in the shuttle about to be picked forms no part of my present invention and may be of any suitable form.

In Figs. 12 and 13 I have indicated the provision of a separate weft detector 41 for each shuttle box, said detectors being of the general type shown in my prior Patent No. 1,633,632. These detectors are selectively rendered operative by control mechanism which may be of the type shown in the prior application of Benjamin F. McGuinnes, Serial No. 73,245, filed December 4, 1925, and are so controlled that they co-operate with the shuttle about to be picked across the lay.

Whenever a detector 41 indicates substantial exhaustion of filling in the running shuttle, the detector operates to slide a rod 42 (Fig. 13) into the path of a lever 43 mounted on a fixed pivot 44 and having its end 45 (Fig. 14) disposed in a recess 46 in the under side of an arm 47.

As the rod 42 is moved rearward with the lay 48 after being projected to the left to indicate weft exhaustion, the rod engages the lever 43 and swings the end 45 forward, thus raising the arm 47 into the path of a regularly operated actuator 49 and being moved forward thereby. The arm 47 is pivoted at 50 to an arm 51 fast on a rock shaft 52 by which the indication is transferred to the magazine end of the loom.

Transfer mechanism

The transferrer 34 (Fig. 1) is mounted to swing about a fixed pivot 55 and is actuated by a link 56 pivoted thereto and having a head 57 provided with a cam slot 58. The slot 58 forms the segment of a circle and is provided with an offset portion or notch 59 (Fig. 11).

An actuating arm 60 is secured to a short shaft 61 (Fig. 10) rotatable in a fixed bearing sleeve 62 and provided with a second arm 63 having a cam roll 64 engaging a double actuating cam 65 on the bottom or cam shaft 66 of the loom.

A stud or roll 67 is mounted on the outer end of the arm 60 and normally swings freely back and forth in the segment slot 58. The link head 57 is provided with a cam surface 68 on its lower side, engaged by a stud or roll 69 on a bell crank 70 pivoted at 71 and connected by a rod or link 72 to certain control mechanism to be described.

When the rod 72 is depressed, the head 57 is moved upward, catching the stud 67 in the notch 59 and thereby causing operative movement of the transferrer 34 to move a selected bobbin rearward into the active or running shuttle S, the replacement of which has been indicated. The ejected bobbin is forced rearward through an opening 74 (Fig. 1) in the lay end 75.

Transfer control mechanism

A hook 77 (Fig. 19) is pivoted at 78 on a plunger 79 vertically slidable in a guideway 80 and having a two-piece actuating rod 81 secured to the lower end thereof. The rod 81 (Fig. 11) is connected at its lower end to a bell crank 82, loosely pivoted on the end of the shaft 61, and having a roll 83 on its depending arm, engaging a double cam 84 on the bottom shaft 66. Springs 85 and 86 (Fig. 11) are provided for holding the cam rolls 64 and 83 firmly against their actuating cams.

The actuating rod 81 is thus drawn downward each pick of the loom, and a spring 87 (Fig. 19) is provided for drawing the rod 81 and plunger 80 upward. A flat spring 88 holds the hook 77 normally in the position shown in Fig. 19, and out of engagement with a stud 90, mounted on a lever 91 secured to a shaft 92 which extends forward to the magazine M and controls the depression of the magazine compartments.

A slide 93 is mounted in a horizontal slot 94 in the stand 95 on which the control mechanism is mounted. The slide 93 is provided with a head 96 (Fig. 21) adapted to engage the forward side of the hook 77.

A cord or flexible connection 97 passes over a guide pulley 98 on the stand 95 and is connected to the rear end of the slide 93. Diagrammatic connections from the indicating shaft 52 to the slide 93 are indicated in Fig. 22, comprising an arm 100 mounted on the left hand end of the shaft 52, to which the cord 97 is connected, being guided thereto by a roll 101. Any other suitable connections may be substituted therefor.

When weft exhaustion is indicated, the cord 97 will be pulled downward, causing the head 96 of the slide 93 to move the hook 77 into engagement with the stud 90, thus causing the actuating rod 81 to depress the lever 91. This rocks the shaft 92 to depress a magazine compartment.

The shaft 92 is also movable axially by connections (not shown) in accordance with the movements of the drop boxes on the detecting end of the loom, so that the compartment corresponding to the shuttle indicated will be depressed.

The mechanism for sliding the shaft 92, commonly called a "color slide", is of the usual type as indicated in my prior application Serial No. 212,996, filed August 15, 1927, above referred to.

The rod 72 (Fig. 11) controlling the operation of the transferrer, is connected at 99 to the lever 91, so that downward movement of the lever 91 also indirectly causes operative movement of the transferrer 34.

In Fig. 22 I have shown a cam 102 for regularly moving a bell crank 103 supporting the actuating member 49 previously described and swinging said member forward at each pick of the loom.

The upper and lower parts of the actuating rod 81 (Fig. 22) are connected by a rocker 104 by which the direction of movement is reversed, so that upward movement of the arm 82 by the cam 84 will draw the plunger 79 positively downward.

Drop box construction

The drop boxes at the magazine end of the loom are in certain respects of special construction. In the drawings I have shown three boxes 40, each having their front sides open and having openings 110 (Fig. 8) in their rear sides through which the spent bobbins may be ejected. A single binder 111 is pivoted at 112 on the lay end 75, said binder being forked to provide an opening 113 (Fig. 9) through which a fresh bobbin may be inserted.

The outer edges of the opening are beveled as also indicated in Fig. 9 to assist in presenting the bobbin in correct vertical position for transfer, and it will be noted that the forked construction of the binder leaves the binder entirely open at the left hand end of the bobbin, thus preventing engagement of the binder with the weft end extending from the transferred bobbin.

It is desirable to relieve the binder pressure before the boxes are shifted vertically and for this purpose I provide a hook-like projection 114 (Figs. 6 and 8ª), engaged by the upper end of a bell crank or lever 115, pivoted at 116 on the lay end 75, and having a roll 117 engaging a cam plate 118 fixed on the loom frame.

Every time that the lay approaches front center, the roll 117 is raised by the cam plate 118, thus momentarily relieving the binder pressure at the time when the drop boxes are moved vertically.

Drop box actuating mechanism

The mechanism for actuating the drop boxes at the magazine end of the loom is also of special construction, so designed that the boxes may be operated at the usual speed, beginning movement approximately at bottom center, except upon the occasion of transfer, but when transfer is indicated, the operation of the boxes is delayed until front center and the speed of operation is doubled, so that the box movement may be completed at the usual time and before picking of the shuttle therefrom.

The drop boxes 40 on the magazine end of the loom are actuated by the usual lifter rod 120 (Fig. 1) connected to the front end of a drop box lever 121. The lever 121 is pivoted at 122 to a second lever 123, which in turn is mounted on a fixed pivot or bracket 124. The rear ends of the levers 121 and 123 are connected to the lower ends of front and back intermediate slides 125 (Fig. 2) to be described.

The mechanism for actuating the levers 121 and 123 is in many respect similar to the ordinary box motion, but involves a duplication thereof. As viewed in plan in Fig. 2, there is shown at the left of said figure a pair of operating units for moving the drop boxes selectively at the usual speed, and at the right in Fig. 2 there is shown a pair of units for actuating the boxes selectively at higher speed and for completing the movement in a shorter interval.

Each unit of the mechanism is of substantially the same construction and a description of one of the units will apply equally to the other three units. Accordingly I will describe the mechanism for moving the slide 125 connected to the lever 121 at slow speed.

Figure 3:
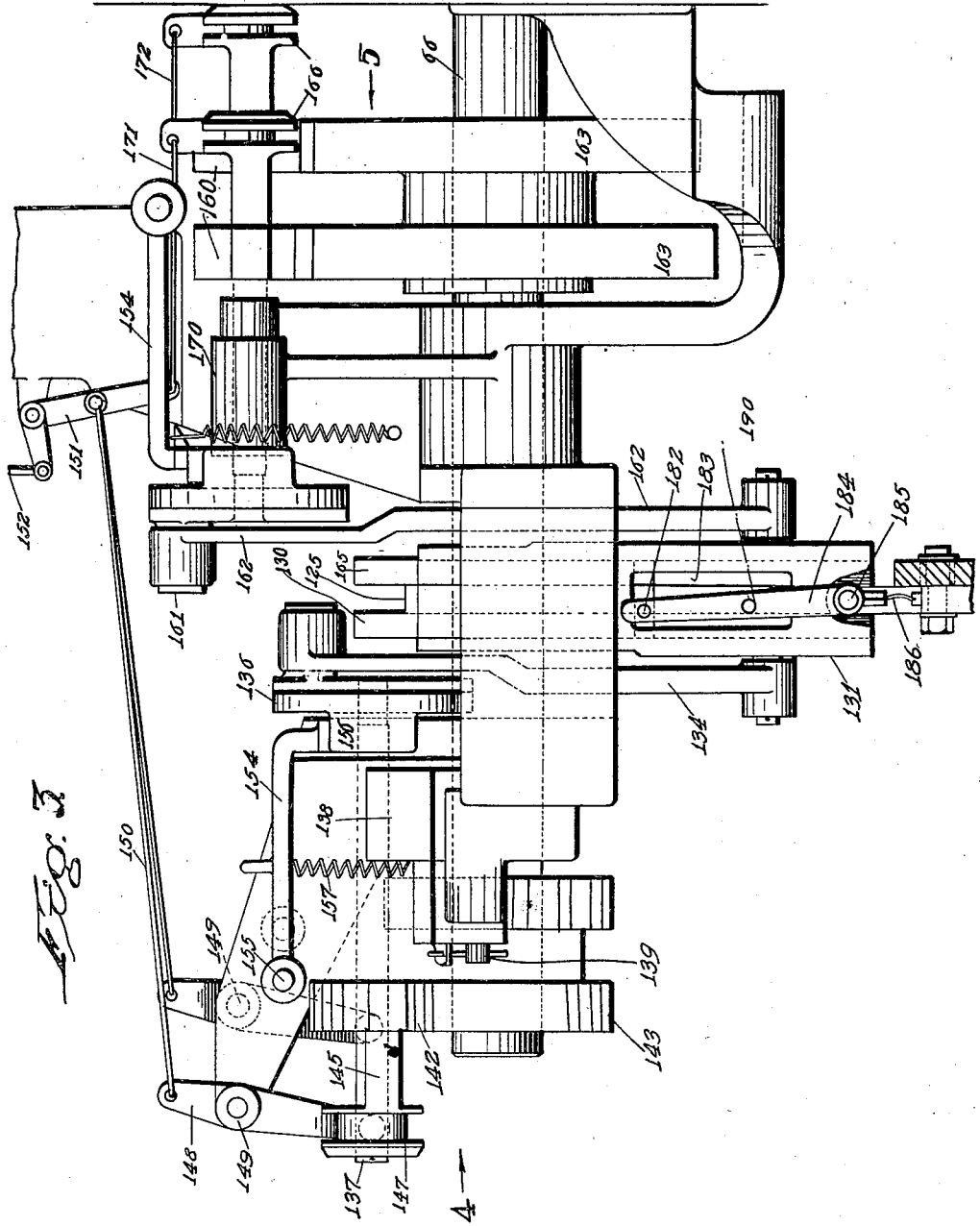
Fig. 3 is a front elevation of the parts shown in Fig. 2, looking in the direction of the arrow 3 in Figs. 1 and 2.

For this purpose, I provide a slide 130 (Fig. 18) slidable in a vertical casing 131 adjacent the front slide 125 and having a stud 132 projecting outward through a slot 133 in the side of the casing and having the lower end of a link 134 pivoted thereto. The upper end of the link 134 is connected to a crankpin 135 (Fig. 2) mounted in a disc 136 secured to a shaft 137, rotatable in a yieldingly mounted bearing member 138 (Fig. 3), adapted to swing about a fixed pivot 139 in a frame 140. The member 138 is normally held in operative position by a spring 141 (Figs. 1 and 4) but is adapted to swing outward to avoid breakage, if the operations of the mechanism is obstructed.

An intermittent pinion 142 is mounted on the left hand or outer end of the shaft 137 and is engaged by an intermittent gear 143 on the shaft 66, continuously rotated in timed relation to the movements of the lay.

The pinion 142 is provided with a pair of axially slidable teeth 145 and 146 connected to a sliding collar 147 (Fig. 3), which in turn is positioned by a rocking lever 148 mounted on a fixed pivot 149 and connected by a link 150 to a bell crank 151, which is connected by a link 152 to pattern mechanism (not shown), but which may be of any usual type.

When the sliding teeth are shifted axially in one direction, the pinion 142 will receive a half revolution and will come to rest, where it will remain until the sliding teeth are shifted axially in the opposite direction, whereupon it will receive a second half revolution.

A retaining device 154 (Fig. 2) is pivoted at 155 and rests upon projections 156 in the rear face of the disc 136. The member 154 is yieldingly pressed downward by a suitable spring 157. The member 154 thus firmly engages the two lugs 156 and holds the crankpin 135 at its upper or lower position until the pin is positively moved therefrom and given a further half revolution.

The box motion mechanism just described is substantially of the usual commercial type and the details thereof in themselves form no part of my present invention.

High speed box motion

The high speed box motion units are substantially identical to the low speed units, one of which has been above described, with the exception that the pinions 160 (Fig. 5) which rotate the crankpins 161 and raise and lower the links 162 on the high speed mechanism are engaged by a large gear 163, with a gear ratio such that the high speed pinions 160 are rotated at twice the speed of the slow motion pinions 142 (Fig. 4) previously described.

The high speed links 162 are connected to slide bars 165 also slidable in the casings 131 adjacent the front and back slides 125 connected to the drop box levers. Grooved collars 166 (Figs. 3 and 15) are provided with sliding pinion teeth 167 and 168, by which the pinions 160 (Fig. 5) are rendered selectively operative. The collars 166 are controlled by yokes 169 mounted on plungers 169a slidable in a fixed casing member 170 and yieldingly pressed outward by springs 171. Similar provision may be made for sliding the collars 147 previously described.

The bell crank 151 (Fig. 3), through which the collars 147 are actuated by suitable pattern mechanism is also connected by links 172 to the yokes 169 which position the collars 166. Accordingly, whenever either one of the slow-speed, drop-box-actuating mechanisms becomes operative, the corresponding high speed mechanism also becomes operative and the vertically moving slide bars 130 and 165 adjacent one of the bars 125 each receive an upward or a downward movement.

The arrangement of the driving teeth on the gears 143 (Fig. 4) and 163 (Fig. 5) is such that the rotation of the slow speed pinions 142 will commence substantially at bottom center and be completed substantially at top center of the movement of the crankpin which drives the lay, while the high speed pinions 160 (Fig. 5) will not begin their rotation until substantially front center, but will also complete their rotation at top center, having travelled at twice the speed for half the time.

During the ordinary operation of the loom, I connect the middle sliding bars 125 to the slides 130 actuated by the slow speed mechanism, so that no unnecessary strain is placed on the box motion. When a transfer is indicated, however, I connect the sliding bars 125 to the slides 165 connected to the high speed mechanism. When transfer thereafter occurs, I am then able to hold the boxes until front center before shifting movement thereof begins, thus giving time for the transfer of a bobbin, which transfer is substantially completed at front center.

Speed selecting mechanism

I will now describe the selective mechanism by which the drop box levers are connected to the slides 130 or to the slides 165.

For this purpose, blocks 180 (Fig. 18) are mounted to slide transversely in slots or recesses 181 in the slides 125, 130 and 165. The blocks are of such length that each block extends through two of the slides only. Consequently if a block is in its left hand position, as viewed in Fig. 18, it connects one of the slow speed slides 130 to the associated slide 125, whereas in its right hand position it correspondingnly connects one of the high speed slides 165 to the associated slide 125.

A stud 182 is secured in each block 180 and extends outward through a slot 183 in the casing 131 and is pivoted in the swinging end of a lever 184, which in turn is pivoted by a stud 185 to the middle slide 125 with which it is associated. The lower end of each arm 184 is notched to receive the upper end of a flat spring 186 and the lower end of the spring is seated in a block 187 slidable in the slide bar 125 and supported by an adjusting screw 188. The spring 186 is compressed so that it is bowed outward, and acts to swing the arm 184 to the left from the dotted line to the full line position in Fig. 16. The arms 184 for the front and back blocks 180 are connected by cords or cables 190 (Fig. 22) to the arm 100 on the feeler indicating shaft 52 previously described, the cord 190 being suitably guided around rolls 192 and acting to shift the blocks 180 to render the high speed slides 165 operative whenever the shaft 52 is rocked to indicate transfer. The return movement of the arms 184 is effected by the springs 186 (Fig. 16) as above described.

Operation

Having described the details of construction, the general operation of my improved loom will be readily apparent. By providing drop boxes on the detecting end of the loom corresponding in number to the number of shuttles, I am able to co-ordinate the magazine color selector with the drop boxes on the detector end and thus always transfer a bobbin corresponding to the indicated shuttle.

By transferring direct to the running shuttle as soon as received, I am able to transfer a bobbin to the indicated shuttle regardless of the particular box in which it is held at the time of transfer. I am thus able to reduce the number of boxes to less than the number of shuttles.

In this way, I reduce the length of the extreme box changes from three boxes to two boxes, and by thus reducing the length of the extreme box movements, I am able to make the high speed changes after transfer, without placing undue strain upon the box mechanism.

With my present construction I also largely avoid the provision of complicated and untried box mechanism, as I use substantially the usual commercial box mechanism, with the addition of similar units operating at twice the speed, and the control mechanism for determining the speed is exceedingly simple.

The transfer mechanism always operates in the same path and transfers the bobbin to a shuttle located at the level of the shuttle race, the transfer being completed before vertical movement of the boxes begins.

I have thus provided a pick and pick loom in which any shuttle may be active for a single pick or for a succession of picks, and in which the weft may be replenished at any time in any one of the running shuttles.

Having thus described my invention and the advantages thereof, I do not wish to be limited to the details herein disclosed, otherwise than as set forth in the claims, but what I claim is:—

1. In a loom, a magazine, weft replenishing mechanism, a plurality of shifting drop boxes at the magazine side of the loom, actuating means effective to shift said boxes at relatively slow speed during normal operation of the loom, actuating means effective to delay movement of said boxes during weft replenishment and to shift said boxes at relatively high speed directly after weft replenishment only, whereby an increased time interval for transfer is provided, and devices to render said actuating means selectively operative.

2. In a loom, a magazine, weft replenishing mechanism, a plurality of shifting drop boxes, actuating means effective to shift said boxes at relatively slow speed during normal operation of the loom, and additional means effective to shift said boxes at relatively high speed directly after weft replenishment only, whereby an increased time interval for transfer is provided, said latter means being rendered operative upon indication of weft exhaustion.

3. In a loom, a magazine, weft replenishing mechanism, a plurality of shifting drop boxes, actuating means effective to shift said boxes at relatively slow speed during normal operation of the loom, and additional means effective to delay the shifting of the same boxes during weft replenishment and to shift said boxes at relatively high speed, directly after weft replenishment only, whereby an increased time interval for transfer is provided.

4. In a loom, a magazine, weft replenishing mechanism, including means to complete transfer substantially at front center, a plurality of shifting shuttle boxes, a crank-shaft connected to oscillate said boxes, actuating means effective to shift said boxes between bottom and top centers of the movement of the crank-shaft during normal operation of the loom, and additional actuating means effective to shift the same boxes between front and top centers of the movement of said crank-shaft directly after weft replenishment only.

5. In a loom, a magazine, weft replenishing mechanism including means to complete transfer substantially at front center, a plurality of shifting shuttle boxes, a crank-shaft connected to oscillate said boxes, actuating means effective to shift said boxes between bottom and top centers of the movement of the crank-shaft during normal operation of the loom, additional actuating means effective to shift the same boxes between front and top centers of the movement of said crankshaft directly after weft replenishment only, weft detecting mechanism, and selective means controlled by said detecting mechanism effective to render either actuating means operative.

6. In a loom, a magazine, weft replenishing mechanism, a plurality of shifting shuttle boxes, actuating means effective to shift said boxes at relatively slow speed during normal operation of the loom, actuating means effective to shift the same boxes at relatively high speed directly after weft replenishment only, both of said actuating means being gear-driven at different ratios from a common driving shaft, and means to render said gear drives selectively operative.

7. A pick and pick loom comprising detecting mechanism at one end of the loom, a weft carrier magazine at the other end of the loom having a plurality of storage compartments, a plurality of drop boxes at the detecting end equal in number to the number of magazine compartments and operatively associated therewith, shifting shuttle boxes at the magazine end shiftable free from operative association with said magazine, separate automatic means for independently shifting the boxes at each end of the loom, whereby pick and pick operation may be effected and transfer means to transfer a weft carrier from any selected compartment indicated by a corresponding weft detector to the shuttle in the shuttle box at the magazine end which is in running position.

8. In a loom, weft detecting mechanism, a magazine, a weft replenishing mechanism, a plurality of drop boxes at the magazine end, means to shift said boxes in a certain time interval during the normal operation of the loom, and means to delay said shifting during transfer until weft replenishment is accomplished and to perform said shifting after weft replenishment in a time interval shorter than the normal period of box shifting, whereby a longer transfer interval is made available.

9. In a loom, a magazine, weft replenishing mechanism, drop box mechanism comprising a plurality of drop box levers, link members connected thereto, low speed operating mechanism therefor, high speed operating mechanism therefor, additional and separate link members connected to said operating mechanisms, and a device effective to connect a selected one of said latter link members to one of said first-mentioned link members to actuate said drop box levers, said high speed mechanism being rendered operative directly after weft replenishment only and providing a relatively longer transfer interval for box movement.

10. In a loom, a magazine, weft replenishing mechanism, and a drop box mechanism comprising drop box levers, a vertically slidably bar connected thereto, a slow speed actuating mechanism, a second vertically slidable bar actuated thereby, a high speed actuating mechanism, a third vertically slidable bar actuated thereby, and selective means effective to connect either said second or said third bar to operate said first bar, said high speed mechanism being rendered operative directly after weft replenishment only and providing a relatively longer transfer interval for box movement.

11. In a loom, a magazine, weft replenishing mechanism, and a drop box mechanism comprising drop box levers, a vertically slidable bar connected thereto, a slow speed actuating mechanism, a second vertically slidable bar actuated thereby, a high speed actuating mechanism, a third vertically slidable bar actuated thereby, and selective means effective to render either said second or said third bar operative to move said first bar and to simultaneously disable the remaining bar, said high speed mechanism being rendered operative directly after weft replenishment only and providing a relatively longer transfer interval for box movement.

12. In a loom, a magazine, weft replenishing mechanism, and a drop box mechanism comprising drop box levers, a vertically slidable bar connected thereto, a slow speed actuating mechanism, a second vertically slidable bar actuated thereby, a high speed actuating mechanism, a third vertically slidable bar actuated thereby, said three bars being mounted side by side, and a transversely slidable member effective to connect said second or said third bar to said first bar and to simultaneously disconnect the other bar therefrom, said high speed mechanism being rendered operative directly after weft replenishment only and providing a relatively longer transfer interval for box movement.

13. In a loom, a drop box mechanism comprising drop box levers, a vertically slidable bar connected thereto, a slow speed actuating mechanism, a second vertically slidable bar actuated thereby, a high speed actuating mechanism, a third vertically slidable bar actuated thereby, selective means effective to render either said second or said third bar operative to move said first bar and to simultanenously disable the remaining bar, and weft detecting mechanism effective to control said selective means and to thereby effect a change in said connections upon indication of weft exhaustion, said high speed mechanism being rendered operative directly after weft replenishment only and providing a relatively longer transfer interval for box movement.

In testimony whereof I have hereunto affixed my signature.

ALBERT A. GORDON.